United States Patent [19]

Cattaneo

[11] Patent Number: 4,557,334

[45] Date of Patent: Dec. 10, 1985

[54] HORSESHOE LINING

[76] Inventor: Giuseppe Cattaneo, Via Maistra 46, CH-7500 St. Moritz, Switzerland

[21] Appl. No.: 640,198

[22] Filed: Aug. 13, 1984

[30] Foreign Application Priority Data

Aug. 25, 1983 [CH] Switzerland .......................... 4642/83

[51] Int. Cl.$^4$ ................................................. A01L 7/02
[52] U.S. Cl. ........................................... 168/12; 168/28
[58] Field of Search ........................ 168/12, 14, 15, 26, 168/28

[56] References Cited

U.S. PATENT DOCUMENTS

| 691,111 | 1/1902 | Campbell | 168/28 |
| 708,607 | 9/1902 | Wood et al. | 168/28 |
| 711,475 | 10/1902 | Conroy | 168/12 |
| 836,150 | 11/1906 | Tappe | 168/28 |
| 985,249 | 2/1911 | Butschko | 168/4 |
| 3,952,807 | 4/1976 | Cattaneo | 168/28 |

Primary Examiner—Robert P. Swiatek
Attorney, Agent, or Firm—Pollock, Vande Sande & Priddy

[57] ABSTRACT

In order to prevent extraneous matter from adhering to hooves, expel any extraneous substances adhering thereto and assist the movement of the animal, a horseshoe-shaped insert body 1 is formed by a bent-over toughly elastic strip of material, the bend forming a tube 2 which contains an air chamber 5 of high resistance to counter-pressure immediately followed by air chamber 5' of low resistance to counter-pressure. The insert body has preliminary cuts 7 which, after being cut open, enable the width to be increased and also reduced. Closures 4 in the tube 2 separate the air chambers 5' of low resistance to counter-pressure which immediately follow them and of which the end parts 6 are open.

5 Claims, 10 Drawing Figures

HORSESHOE LINING

BACKGROUND TO THE INVENTION

This invention relates to a lining to be inserted between the horseshoe and the hoof.

Various types of linings for horses' hooves are known, serving as shock absorbers when the animal is walking or galloping, and also designed to prevent extraneous substances from adhering to the hoof or intended to reduce the danger of slipping. For shock absorbing purposes an annular lining with closed air cushions has been proposed, projecting from the under the middle of the horseshoe. This was found to suffer from the drawback that the shock absorbing action had an unfavourable effect on the hoofed animals' gait. In walking, the front part of the hoof is always the first part to make contact with the ground, the impact being considerable and the air being pressed to the rear, so that the rear part is hardened, the expulsion of extraneous substances adhering to the hoof not occurring at all. For correct walking the front part of the lining requires hard elastic properties but the rear part soft elastic properties.

OBJECT OF THE INVENTION

An object of the invention is to provide a horseshoe lining by means of which a distribution of the shock absorbing action, by which the animals' gait is favourably influenced.

A further object is to cause extraneous bodies of all kinds adhering to the hoof to be expelled. Another object is to enable the width to be adjustable, in order to adapt the shoe to different hoof sizes.

SUMMARY OF THE INVENTION

According to the invention there is provided a horseshoe lining of elastic material for positioning between the hoof and the horseshoe, comprising an elastic insert body formed by a strip bent through a full circuit, the inside edge of its bend forming a tube and its outside edge forming, by interconnecting the sides of the strip, a securing lug, while the tube, in its bent part, has a closed air chamber resistant to counter-pressure and, immediately following the latter, air chambers less resistant to counter-pressure, in order to keep the shock absorbing action in walking more effective on the front part of the hoof but weaker on the rear part, and also that the securing lug, in the bent part, has preliminary cuts which, after being completely cut, enable the width of the horseshoe-shaped insert body to be increased or reduced.

BRIEF DESCRIPTION OF THE DRAWINGS

The invention will be explained below by reference to an example illustrated in the accompanying drawing in which.

DESCRIPTION OF PREFERRED EMBODIMENTS

Figure 1:
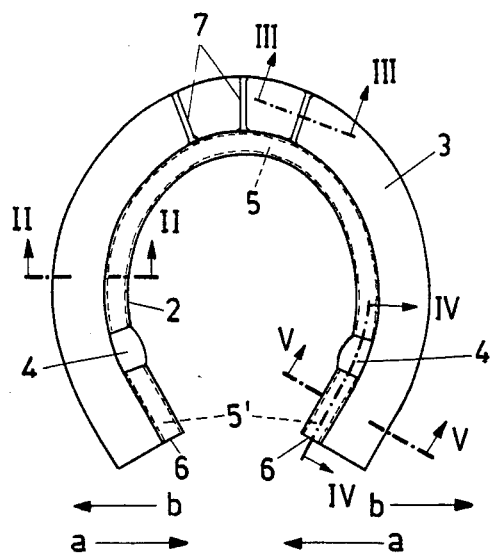
FIG. 1 is a view towards the bottom of the lining.
Figure 2:
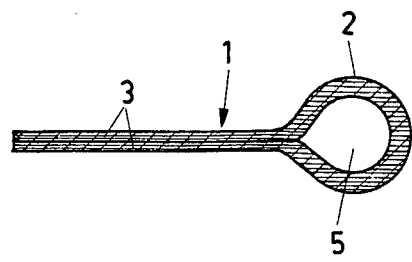
FIG. 2 is a section along the line II—II of FIG. 1, on a larger scale.
Figure 3:
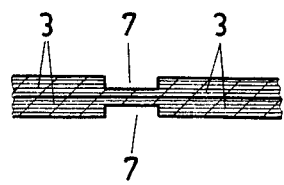
FIG. 3 is a partial section along the line III—III of FIG. 1, on a still larger scale than FIG. 2.
Figure 4:
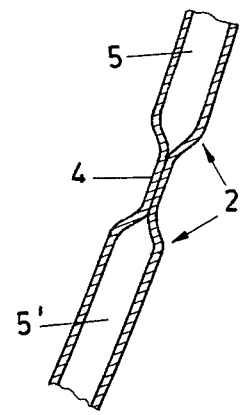
FIG. 4 is a section along the line IV—IV of FIG. 1, on a larger scale.
Figure 5:
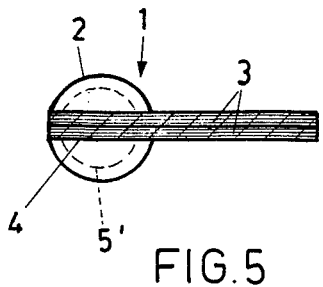
FIG. 5 is a section along the line V—V of FIG. 1, on a larger scale.
Figures 6, 7:
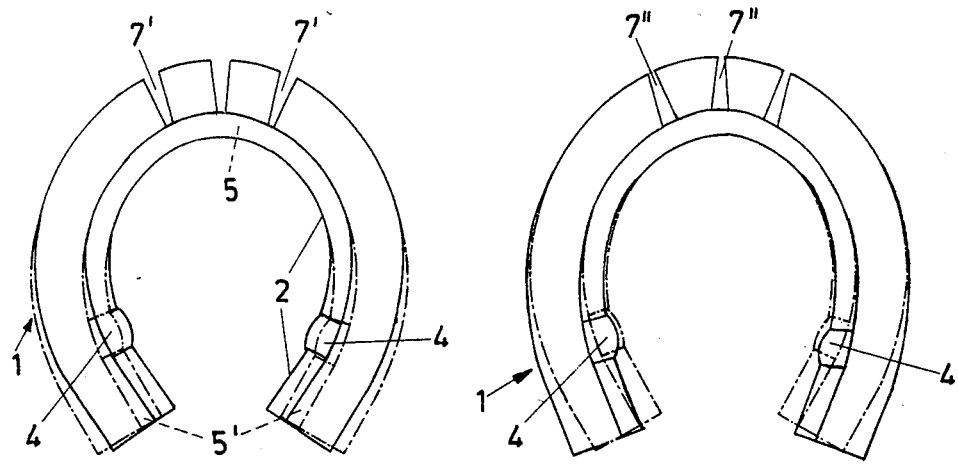
FIG. 6 is a view from the bottom of the insert body, when reduced in size.
FIG. 7 is a similar view of the insert body in an enlarged state.

The item marked 1 is a horseshoe-shaped insert body produced by a strip of elastic material such as plastic, e.g., propylene or the like, bent over through a full circle. The bend forms a tube 2, and the sides 3 of the strip are interconnected by their mutually facing sides by means of an adhesive. The tube 2 and the sides 3 of the strip are thus in one piece. Closures 4, formed by compressions and weldings, form on the bent part of the insert body a closed air chamber 5, resistant to counter-pressure, in the tube 2. The air chambers 5' comparatively non-resistant to counter-pressure and immediately following the closures 4 and situated at the two ends of the bend of the tube, however, are open at their ends (FIG. 1). At the apex of the horseshoe-shaped insert body 1, the outer edges of the sides of the strip have preliminary cuts 7 formed by grooves and situated at a certain distance apart in the radial direction. When the preliminary cuts 7 are completely cut open and the free ends of the insert body are compressed in the directions shown by the arrows a (FIG. 1), widened peripheral incisions 7' are produced, as shown in FIG. 6. The width of the horseshoe-shaped insert body is thereby somewhat reduced. On the other hand, if the free ends of the insert body are drawn apart in the direction shown by the arrows b (FIG. 1), this produces narrowed incisions 7" on the periphery, the width of the insert body 1 thus being somewhat increased. The dot-and-dash lines in FIGS. 6 and 7 show the normal positions of the insert body, while the full lines in FIG. 6 show the reduction in size and those in FIG. 7 in places in which the size is increased.

Figures 8, 9:
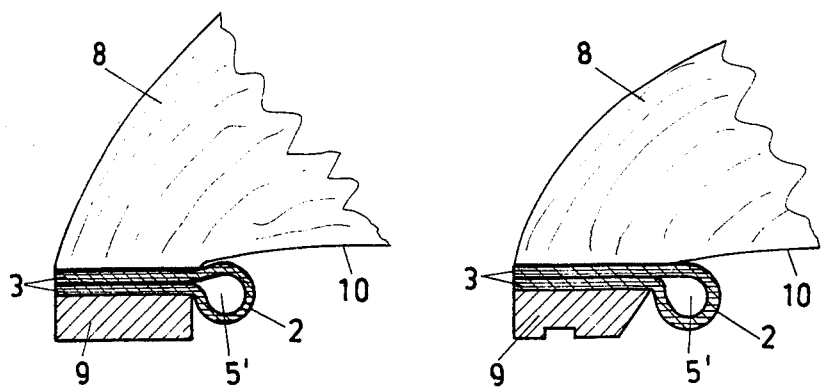
FIG. 8 is a partial cross-section along the line II—II of FIG. 1 at a greater size.
FIG. 9 is a similar view, showing a horseshoe for a racing horse.
Figure 10:
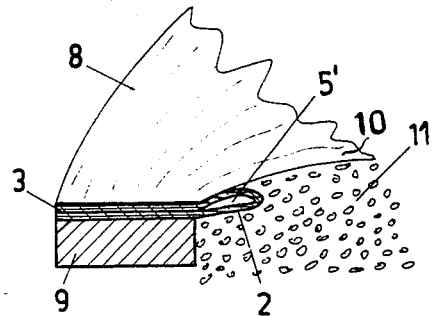
FIG. 10 is a cross section as in FIG. 8, showing the tube of the insert body compressed by extraneous matter.

According to FIGS. 8–10 the insert body 1 between the hoof 8 and the horseshoe 9 affixed to the latter is secured by means of conventional horseshoe nails, not shown in the drawing. Sharp or blunt screw hooks can be provided on the horseshoe in the usual manner. The horseshoes in FIGS. 8 and 9 differ merely in shape. In each case the tube 2 is situated between the upper inside edge of the horseshoe 9 and the arched sole 10 of the hoof. The lower side of the tube 2 extends approximately as far as half way up the horseshoe 9, and under no circumstance should it be allowed to extend down to the bottom thereof, still less to project down beyond the latter. Loose extraneous substances 11 which have found their way into the space between the sole 10 of the hoof and the horseshoe 9, such as snow, sand, turf etc., compress the tube 2 to some extent when the hoof 8 pressed on the ground by the horseshoe 9, as shown in FIG. 10, and the tube then undergoes elastic deformation. When the hoof is raised off the ground the load causing deformation is reduced or nullified altogether. The deformed tube always tends to resume its initial position, any extraneous matter adhering thereto then being pressed away from it. The difference between the air chambers 5 and 5' in their elastic characteristics is particularly important. The closed air chamber 5, with its high resistance to counter-pressure, has different elasticity characteristics from the open air chambers 5' with their comparatively low resistance to counter-pressure. The elastic deformations therefore differ and enable the system to be adapted to the gait of the particular animal. In walking and galloping the front part of the hoof with its horseshoe makes contact with the ground first, and the deformation pressure is far greater than on the rear part in the zone of the air chamber 5' with their lower resistance to counter-pressure. In the subsequent impact of the air chambers 5' on the ground these latter are compressed and the air is conveyed out of them through the open end parts 6. The displacements and the effects of the air chambers 5' of comparatively low resistance to counter-pressure are fundamentally different from those obtained in the case of the air chamber 5 of high resistance to counter-pressure. The air chambers 5' of comparatively low resistance to counter pressure are normally compressed almost completely, as shown in FIG. 10. The air chamber 5 of high resistance to counter-pressure, on the other hand, is compressed to a smaller extent and is able to absorb impacts more satisfactorily. The differences between the air chambers 5 and 5' in their effects not only facilitate the walking of the hoofed animals but at the same time assist in expelling the extraneous matter 11 adhering to the hooves, this being partly due to the fact that the deformations of the air chamber 5 of high resistance to counter-pressure differ from those of the air chambers 5' of low resistance to counter-pressure by some fractions of a second.

The insert body 1 situated between the hoof 8 and the horseshoe 9 is very favourable to the movement of horses thanks to its toughly elastic nature and to the difference between the front and the rear part as regards the air cushion effects, in addition to which it assists in preventing diseases and injuries and proves useful for all types of gait, whether walking, trotting or galloping. It also balances out any unevenness in the hoof when the horse is shod by the "cold method".

I claim:

1. A horseshoe lining of elastic material for positioning between the hoof and the horseshoe, comprising a horseshoe-shaped elastic insert body formed by a strip bent through a full circle, the inside edge of the strip in the horseshoe shape forming a tube and its outside edge forming, by interconnection of the sides of the strip, a securing lug, wherein said tube, in an intermediate part, has a closed air chamber resistant to counter-pressure and, at its ends air chambers less resistant to counter-pressure, in order to keep the shock absorbing action in walking more effective on the front part of the hoof but weaker on the rear part, and further, wherein said securing lug, in an intermediate part, has preliminary cuts which, after being completely cut, enable the width of the horseshoe-shaped insert body to be increased or reduced.

2. A horseshoe lining according to claim 1, wherein the tube for the formation of the closed air chamber resistant to counter-pressure has closures in the intermediate part and wherein the air chambers with comparatively low resistance to counter-pressure, situated on both sides of said closures, are open at their ends.

3. A horseshoe lining according to claim 2, wherein the closures are formed by welds.

4. A horseshoe lining according to claim 1, wherein the sides of the strip are interconnected by means of an adhesive by their mutually facing sides and form the securing lug.

5. A horseshoe lining according to claim 1, wherein the preliminary cuts comprise grooves on the outer edges of the sides of the strip.

* * * * *